US008813573B2

(12) United States Patent
Njikam Njimonzie et al.

(10) Patent No.: US 8,813,573 B2
(45) Date of Patent: Aug. 26, 2014

(54) MICROMECHANICAL COMPONENT AND PRODUCTION METHOD FOR A MICROMECHANICAL COMPONENT

(75) Inventors: Frederic Njikam Njimonzie, Reutlingen (DE); Wolfram Schock, Rommelsbach (DE); Joerg Muchow, Reutlingen (DE); Zoltan Lestyan, Martonvasar (HU)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 13/321,625

(22) PCT Filed: May 18, 2010

(86) PCT No.: PCT/EP2010/056806
§ 371 (c)(1),
(2), (4) Date: Feb. 3, 2012

(87) PCT Pub. No.: WO2010/136356
PCT Pub. Date: Dec. 2, 2010

(65) Prior Publication Data
US 2012/0125117 A1  May 24, 2012

(30) Foreign Application Priority Data

May 27, 2009  (DE) .......................... 10 2009 026 506

(51) Int. Cl.
*G01B 7/16* (2006.01)
(52) U.S. Cl.
USPC .......................................................... 73/777
(58) Field of Classification Search
USPC .................................................. 73/760, 777
See application file for complete search history.

(56) References Cited

U.S. PATENT DOCUMENTS

| | | | | |
|---|---|---|---|---|
| 7,250,705 | B2 * | 7/2007 | Dewa et al. | 310/321 |
| 8,187,903 | B2 * | 5/2012 | Yama et al. | 438/52 |
| 8,264,797 | B2 * | 9/2012 | Emley | 360/294.4 |
| 8,593,032 | B2 * | 11/2013 | Phan Le et al. | 310/318 |

FOREIGN PATENT DOCUMENTS

| | | |
|---|---|---|
| JP | 9-96552 | 4/1997 |
| JP | 9-197334 | 7/1997 |
| JP | 2002-250890 | 9/2002 |
| JP | 2004-245890 | 9/2004 |
| JP | 2005-279863 | 10/2005 |
| JP | 2006-195290 | 7/2006 |
| JP | 2007-25608 | 2/2007 |
| JP | 2007-307662 | 11/2007 |
| JP | 2008-168423 | 7/2008 |

OTHER PUBLICATIONS

Chi Zhang, Gaofei, Zhang, Zheng You: "A Two-Dimensional Micro Scanner Integrated with a Piezoelectric Actuator and Piezoresistors," Sensors, vol. 9, Jan. 23, 2009, pp. 631-644.

(Continued)

*Primary Examiner* — Max Noori
(74) *Attorney, Agent, or Firm* — Kenyon & Kenyon LLP

(57) ABSTRACT

A micromechanical component includes: an adjustable element connected to a holder at least via a spring; a first sensor device with at least one first piezo-resistive sensor element, which first sensor device provides a first sensor signal relating to a first mechanical stress, the first piezo-resistive sensor element being situated on or in an anchoring region of the spring; and a second sensor device with at least one second piezo-resistive sensor element, which second sensor device provides a second sensor signal relating to a second mechanical stress, the second piezo-resistive sensor element being situated on or in an anchoring region of the spring.

10 Claims, 5 Drawing Sheets

(56) References Cited

OTHER PUBLICATIONS

Tarik Bourouina et al.: "Integration of Two Degree-of-Freedom Magnetostrictive Actuation and Piezoresistive Detection: Application to a Two-Dimensional Optical Scanner," Journal of Microelectromechanical Systems, IEEE Service Center, Piscataway, NJ, vol. 11, No. 3, Jun. 1, 2002, pp. 355-361.

Sasaki, M. et al.: "Piezoresistive Rotation Angle Sensor Integrated in Micromirror," Japanese Journal of Applied Physics, JP, vol. 45, No. 4B, Apr. 1, 2006, pp. 3789-3793.

International Search Report for PCT/EP2010/056806, dated Feb. 18, 2011.

* cited by examiner

MICROMECHANICAL COMPONENT AND PRODUCTION METHOD FOR A MICROMECHANICAL COMPONENT

BACKGROUND OF THE INVENTION

1. Field of the Invention

The present invention relates to a micromechanical component and a production method for a micromechanical component.

2. Description of Related Art

A micromechanical component often has an element that is adjustable in relation to a holder of the micromechanical component. In addition, the micromechanical component may have an evaluation device which is configured to establish information regarding a current position of the adjustable element in relation to the holder.

A conventional evaluation device includes, for example, an optical sensor including a light source for emitting a light beam, which is directed onto a reflective surface of the adjustable element, and a detector for determining the point of impingement of the light beam reflected at the reflective surface. An optical sensor of that kind, however, is relatively expensive and requires a relatively large amount of installation space. Furthermore, the evaluation method for evaluating the values provided by the optical sensor is comparatively complicated.

As an alternative to the optical sensor, the evaluation device may also have a capacitive sensor. In that case, the adjustable element includes a first electrode. A capacitance between the first electrode and a second electrode which is fixedly situated on the holder allows inferences to be made regarding the current position of the adjustable element in relation to the holder. An evaluation device having such a capacitive sensor does, however, require costly electronics to filter out interfering signals. Furthermore, applied voltages of an electric drive for adjusting the adjustable element in relation to the holder may lead to measuring errors of the capacitive sensor.

In addition, measuring methods are known from the related art in which a spring, via which the adjustable element is connected to the holder, is equipped with a piezo-resistive sensor element. Frequently, adjustment of the adjustable element in relation to the holder causes mechanical stresses to be applied in that case to the piezo-resistive element. A sensor signal provided by the piezo-resistive sensor element is altered by the mechanical stresses.

To perform such a measuring method, however, it is necessary for the piezo-resistive sensor element situated on or in the spring to be electrically connected by electrical supply and/or detection lines. This frequently leads to problems, especially when at least two piezo-resistive sensor elements are used for determining a change in the current position of the adjustable element in at least two directions in space. According to the related art, in the case of such a measuring method a first piezo-resistive sensor element is situated on or in a first spring and a second piezo-resistive sensor element is situated on or in a second spring. As a rule, the first spring is twisted upon adjustment of the adjustable element about a first rotation axis. Correspondingly, the second spring is twisted as soon as the adjustable element is adjusted in relation to the holder about a second rotation axis.

If the first spring is in the form of an outer spring and the second spring is in the form of an inner spring, the supply and/or detection lines of the second piezo-resistive sensor element have to be routed, however, via the first spring. It is hardly possible to do that, especially in the case of narrow springs having a width of less than 50 µm. In addition, the supply and/or detection lines of the second piezo-resistive sensor element may be damaged upon bending of the first spring, especially if they are made of aluminum. Furthermore, the supply and/or detection lines of the second piezo-resistive sensor element which are routed via the first spring generally reduce the adjustability of the adjustable element about the first rotation axis.

BRIEF SUMMARY OF THE INVENTION

The present invention provides a micromechanical component and a production method for a micromechanical component.

The first anchoring region of the spring and/or the second anchoring region of the spring are/is to be understood, for example, as meaning a region of the holder and/or a region of the adjustable element that contact(s) or abut(s) on the spring. Preferably, the spring is so connected via the first anchoring region to at least one subunit of the holder and is so connected via the second anchoring region to at least one subunit of the adjustable element that mechanical stresses occur in at least one anchoring region upon torsion or bending of the spring.

By arranging the first piezo-resistive sensor element and the second piezo-resistive sensor element on or in the common spring or at least one anchoring region it is possible, for example, to form at least one common line of the first piezo-resistive sensor element and the second piezo-resistive sensor element. A common line is to be understood as being a line that contacts the first piezo-resistive sensor element and the second piezo-resistive sensor element. In that manner, it is possible to reduce the number of lines required for the electrical connection of the two piezo-resistive sensor elements when the two piezo-resistive sensor elements are situated on a common spring. The reduced number of lines required ensures better adjustability of the adjustable element in relation to the holder.

In a preferred embodiment, the second piezo-resistive sensor element is situated on or in the same spring as the first piezo-resistive sensor element. In that case, relatively great mechanical stresses are exerted on at least one of the two sensor elements upon torsion or bending of the spring.

Preferably, the two sensor devices are so configured that the first sensor device does not detect/determine any first mechanical stress acting on the second sensor element, and the second sensor device does not detect/determine any mechanical stress acting on the first sensor element.

In particular, the spring with the two piezo-resistive sensor elements may be constructed in the form of an outer spring. In that case, the spring together with the two piezo-resistive sensor elements is configured for direct contact with the holder. That also disposes of the problems that customarily occur when lines are routed via at least one spring. In particular, the risk of damage to a line routed via a spring is prevented.

Over and above that, for certain variants it is necessary for two potentials (a ground potential and a variable signal in the range of several 100 V) for the actual actuation to be routed via an outer spring. Such a high voltage may customarily interfere with the selection signal. For that reason, detection is preferably carried out at an outer spring.

The advantages of the micromechanical component described in the preceding paragraphs are also afforded in a corresponding production method for a micromechanical component.

DETAILED DESCRIPTION OF THE INVENTION

Figure 1:
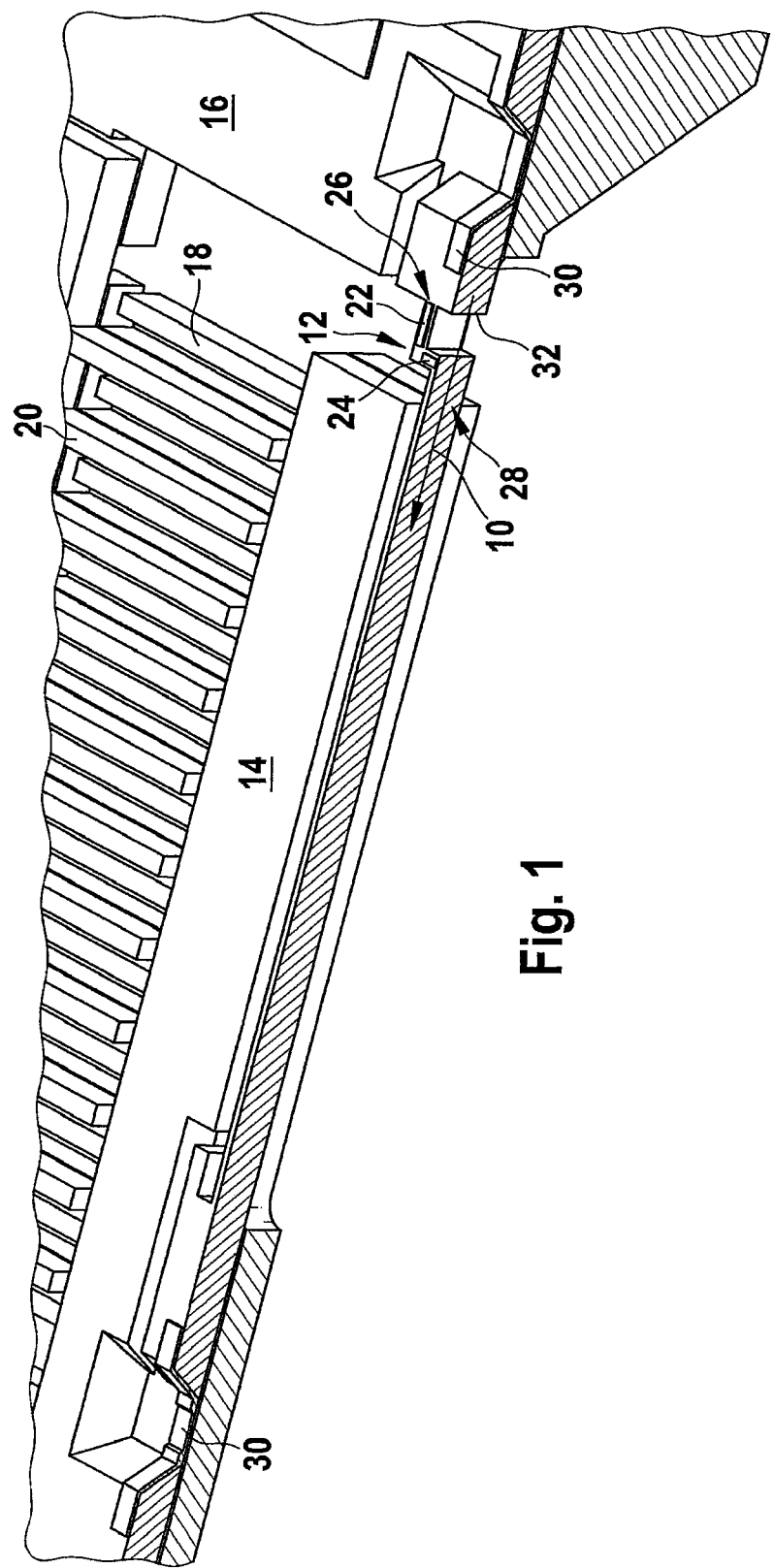
FIG. 1 shows a cross-section through a first embodiment of the micromechanical component.

FIG. 1 shows a cross-section through a first embodiment of the micromechanical component.

The illustrated cross-section through the micromechanical component extends along a longitudinal axis 10 of a spring 12 via which an adjustable element 14 is connected to a holder 16 of the micromechanical component. Spring 12 may be patterned out of a monocrystalline silicon material. A preferred material for spring 12 is silicon. Preferably, longitudinal axis 10 of spring 12 extends along the 110 crystal direction of the monocrystalline silicon material. As will be explained in more specific detail hereinafter, such a spring 12 makes it easier to implement a Wheatstone bridge and/or a xducer. Above all, an advantageous orientation of the piezo-resistive sensor element of the Wheatstone bridge or xducer may be easily carried out in this case. In particular, spring 12 may be formed in one piece with at least one subunit of holder 16 and/or of adjustable element 14.

In the case of the exemplary embodiment illustrated, a first end portion of spring 12, adjacent to holder 16, has a continuous opening which subdivides spring 12 into a first arm, a second arm (not shown) and a connecting web. The advantages of such a configuration of spring 12 will be discussed in greater detail hereinafter.

In addition to having spring 12, the micromechanical component may also include at least one further spring which connects adjustable element 14 to a holder 16. In one advantageous embodiment, spring 12 in the form of an outer spring may connect holder 16 to at least one further spring in the form of an inner spring, while the at least one inner spring is situated between spring 12 and adjustable element 14. In addition to having spring 12 in the form of an outer spring, the micromechanical component may also include a further outer spring. The technique according to the present invention which is described hereinafter does not represent a requirement of the at least one further spring. Therefore, the embodiment described herein is not limited to the at least one further spring or to a specific construction of the at least one further spring.

Adjustable element 14 may include, for example, a mirror plate (not shown). It is pointed out, however, that the micromechanical component is not limited to a construction in the form of a micromirror.

In the case of the embodiment illustrated, the micromechanical component includes an actuator electrode comb 18, which is situated on adjustable element 14, and a stator electrode comb 20, which is fixedly connected to holder 16. Electrode combs 18 and 20 are subunits of an electrostatic drive which is configured to adjust adjustable element 14 in relation to holder 16. The micromechanical component is not, however, limited to such an electrostatic drive. As an alternative or in addition to electrode combs 18 and 20, the micromechanical component may include at least one further electrical and/or magnetic drive component.

Preferably, the drive of the micromechanical component is configured to adjust adjustable element 14 in relation to holder 16 about longitudinal direction 10 of spring 12 and about a rotation axis oriented non-parallel to longitudinal direction 10. One may also speak in this case of a biaxially suspended adjustable element 14.

The micromechanical component illustrated includes a first sensor device 22 having a first piezo-resistive sensor element (not shown), and a second sensor device 24 having a second piezo-resistive sensor element (not shown). The first piezo-resistive sensor element and the second piezo-resistive sensor element are situated on or in spring 12. An arrangement of piezo-resistive sensor elements on or in spring 12 is to be understood as meaning, for example, positions of the piezo-resistive sensor elements lying between a first connection surface 26 of spring 12 with holder 16 and a second connection surface 28 of spring 12 with adjustable element 14. Connection surfaces 26 and 28 may also be virtual surfaces, that is, minimal end portions of spring 12, and/or anchoring regions of spring 12. Advantageous exemplary embodiments and positions for the piezo-resistive sensor elements of sensor devices 22 and 24 will be described in more specific detail hereinafter.

Lines for an electrical connection of the drive and/or of at least one of sensor devices 22 and 24 may be formed on the micromechanical component by coatings 30 and dopings 32. Since methods for the production of spring 12, the drive with electrode combs 18 and 20 and the lines formed by coatings 30 and dopings 32 will be apparent to the person skilled in the art by reference to FIG. 1, those methods are not discussed here.

Figure 2:
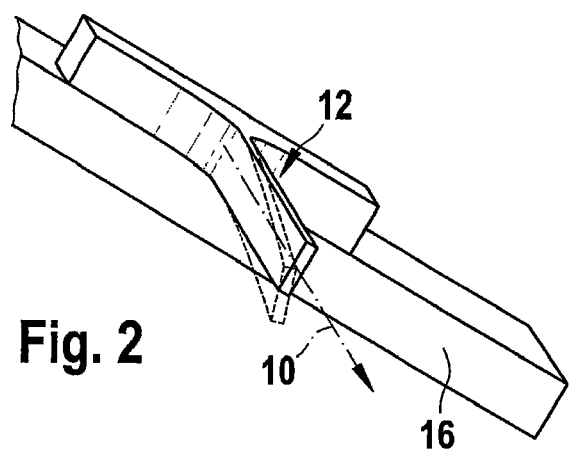
FIG. 2 shows a spring of a second embodiment of the micromechanical component.

FIG. 2 shows a spring of a second embodiment of the micromechanical component.

If no load is applied to spring 12 illustrated, spring 12 lies in its home position (continuous lines). This is the case, for example, when a drive for adjusting the adjustable element of the micromechanical component is not being operated. In its home position, spring 12 extends along its longitudinal axis 10.

By way of spring 12 illustrated, an adjustable element (not shown) is adjustably connected to holder 16 (only part of which is illustrated). Preferably, the adjustable element may be adjusted about longitudinal axis 10 and a rotation axis oriented non-parallel to longitudinal axis 10. Advantageously, the rotation axis is perpendicular to longitudinal axis 10. An adjusting movement of the adjustable element about longitudinal axis 10 and/or the rotation axis causes a corresponding bending movement of spring 12 (broken lines).

If the adjustable element is rotated, for example, about longitudinal axis 10, this causes torsion of spring 12 about longitudinal axis 10. Torsion of spring 12 about longitudinal axis 10 is used hereinafter to mean a deformation of spring 12 in which a second end portion of spring 12, which second end portion is toward the adjustable element, is rotated about longitudinal axis 10 in relation to a first end portion of spring 12, which first end portion is adjacent to holder 16. Upon such torsion of spring 12 about longitudinal axis 10, mechanical stresses occur especially in the first end portion of spring 12.

Similarly, adjustment of the adjustable element about the rotation axis oriented non-parallel to longitudinal axis 10 causes a deformation of spring 12, which is referred to hereinafter as bending of spring 12 about the rotation axis. Upon bending of spring 12 about the rotation axis, the second end portion is adjusted about the rotation axis in relation to the first end portion. Mechanical stresses occur in the first end portion also in the case of such a bending of spring 12.

As will be described in more specific detail hereinafter, the micromechanical component includes two sensor devices (not shown) each having at least one piezo-resistive sensor element. The at least two piezo-resistive sensor elements are so situated on or in spring 12 that the mechanical stresses occurring upon torsion of spring 12 about longitudinal axis 10 and/or upon bending of spring 12 about the rotation axis act on at least one piezo-resistive sensor element. Each of the sensor devices is configured to provide, when there is mechanical stress on the associated piezo-resistive sensor element, a corresponding sensor signal to an evaluation device (not shown) of the micromechanical component. The sensor signals provided by the sensor devices may include voltages, voltage changes, resistances and/or resistance changes.

The evaluation device is configured to establish, taking into consideration the sensor signals provided, first information regarding a first adjustment movement and/or bending movement of the adjustable element and/or of spring 12 about longitudinal axis 10 and second information regarding a second adjustment movement and/or bending movement of the adjustable element and/or of spring 12 about the rotation axis. First information and/or second information may, for example, include a first adjustment angle by which the adjustable element and/or spring 12 is adjusted about longitudinal axis 10, and/or a second adjustment angle by which the adjustable element and/or spring 12 is rotated about the rotation axis. As an alternative or in addition to an adjustment angle, first information and/or second information may also include at least one further quantity describing the current position and/or a change in the current position of the adjustable element in relation to the holder. Especially advantageous embodiments and positions of a piezo-resistive sensor element and constructions of the evaluation device will be discussed in more specific detail hereinafter.

It is pointed out here that it is sufficient for the at least two piezo-resistive sensor elements of the two sensor devices to be situated on or in a single spring 12 in order to ascertain or establish information regarding the adjustment movements and/or bending movements of the adjustable element and/or spring 12 about two axes that are non-parallel to each other. Advantages of that arrangement of the at least two piezo-resistive sensor elements of the two sensor devices on or in spring 12 without the use of a further spring for arrangement of the at least two piezo-resistive sensor elements will be discussed in detail hereinafter.

Figure 3A:
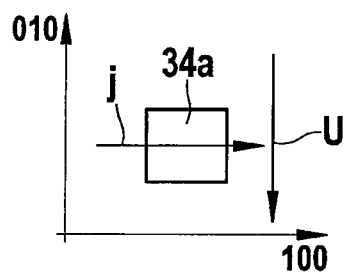
FIGS. 3A to 3C show coordinate systems to illustrate possible arrangements for a piezo-resistive sensor element of the micromechanical component.
Figure 3B:
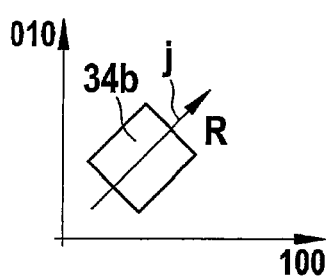
Figure 3C:
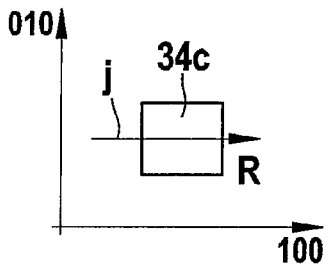

FIGS. 3A to 3C show coordinate systems to illustrate possible arrangements for a piezo-resistive sensor element of the micromechanical component. The abscissa of the coordinate systems illustrated corresponds to a 100 crystal direction of a monocrystalline silicon material. The ordinate represents the 010 crystal direction of the monocrystalline silicon material.

The piezo-resistive sensor element reproduced schematically in FIG. 3A is a p-doped piezo 34a of a sensor device in the form of a xducer. The sensor element in the form of a p-doped piezo 34a is formed in a monocrystalline silicon material. Since methods for the production of a xducer with a p-doped piezo 34a in a moncrystalline silicon layer are known to the person skilled in the art, they will not be discussed further.

A xducer is constructed in such a manner that mechanical stresses on p-doped piezo 34a cause a voltage change. If a current j is passed through p-doped piezo 34a, the voltage change may be determined by tapping a voltage U at p-doped piezo 34a. A maximum voltage change is present if p-doped piezo 34a lies in the 100 crystal direction of a monocrystalline silicon layer and the mechanical stress acting on p-doped piezo 34a is oriented parallel or perpendicularly to the 100 crystal direction of the moncrystalline silicon layer.

For reliable operation of the sensor device, p-doped piezo 34a is therefore oriented along the 100 crystal direction. With such an orientation of p-doped piezo 34a, current j is passed through p-doped piezo 34a preferably along the 100 crystal direction. Voltage U is tapped at p-doped piezo 34a perpendicularly to current j.

FIG. 3B reproduces a preferred orientation of a p-doped resistor 34b, a half bridge and/or a sensor device in the form of a Wheatstone bridge. A Wheatstone bridge may include four p-doped resistors 34b in the form of piezo-resistive sensor elements.

Preferably, a p-doped resistor 34b of the Wheatstone bridge is embedded in a monocrystalline silicon material in such a manner that p-doped resistor 34b is oriented along the 110 crystal direction of the monocrystalline silicon material and a current j is passed through p-doped resistor 34b along the 110 crystal direction. As the sensor signal of the Wheatstone bridge, a resistance R/a resistance change is tapped at the four p-doped resistors 34b. Advantageously, tapping of the resistance R/the resistance change takes place perpendicularly to the orientation of at least one p-doped resistor 34b.

The sensor device illustrated with the aid of FIG. 3C includes a resistor, a half bridge and/or four n-doped resistors 34c connected as a Wheatstone bridge. A maximum resistance change is present in such a Wheatstone bridge if the four n-doped resistors 34c are oriented in the 100 crystal direction of a monocrystalline silicon material and the mechanical stress acts on the four n-doped resistors 34c in a direction parallel or perpendicular to the 100 crystal direction.

The Wheatstone bridge is therefore situated on or in a monocrystalline silicon material in such a manner that at least one of the n-doped resistors 34c is oriented along the 100 crystal direction and a current j is passed through the n-doped resistor 34c along the 100 crystal direction. In that case also, it is possible to measure a resistance R/a resistance change at n-doped resistors 34c. By virtue of such an advantageous orientation of n-doped resistors 34c, the mechanical stresses exerted on n-doped resistors 34c cause a maximum resistance change. Preferably, the resistance R/resistance change is measured at n-doped resistors 34c perpendicularly to current j.

A sensor device 22 or 24 having at least one p-doped piezo 34a and/or a Wheatstone bridge having four resistors 34b or 34c is inexpensive and comparatively easy to produce. Further advantageous examples for arranging at least one p-doped piezo 34a, p-doped resistor 34b and/or n-doped resistor 34c on a spring 12 of a micromechanical component are mentioned in more specific detail below.

Figure 4:
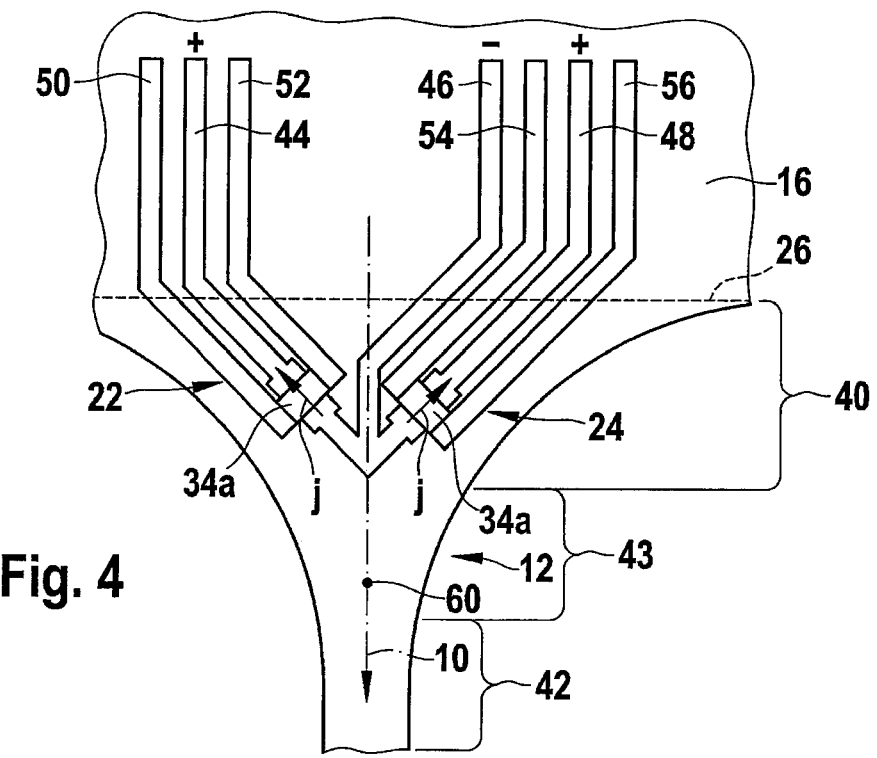
FIG. 4 shows a spring of a third embodiment of the micromechanical component.

FIG. 4 shows a spring of a third embodiment of the micromechanical component.

Spring 12 illustrated is patterned out of a monocrystalline silicon material in such a manner that a longitudinal direction 10 of spring 12 (in the home position) extends along a 110 crystal direction of the monocrystalline silicon material. Via spring 12, an adjustable element (not shown) is connected to a holder 16.

An average width of spring 12 may be below 50 µm. For example, the average width of spring 12 is between 10 and 30 µm. A first end portion 40 of spring 12, which first end portion 40 is situated adjacent to holder 16, has a maximum width that is greater than a maximum width of a second end portion 42 oriented toward the adjustable element. Similarly, the maximum width of first end portion 40 is greater than a maximum width of an intermediate portion 43 of spring 12, which intermediate portion 43 extends from first end portion 40 to second end portion 42. One may also describe this as a widening of first end portion 40 in comparison with second end portion 42 and/or intermediate portion 43 of spring 12.

Preferably, the width of first end portion 40 steadily increases along the direction from intermediate portion 43 to holder 16. One may also describe this as a solid V-shaped spring connection of spring 12 to holder 16.

Situated on or in first end portion 40 there are a first p-doped piezo 34a of a first sensor device 22 in the form of a xducer and a second p-doped piezo 34a of a second sensor device 24 in the form of a xducer. Each of the xducers acting as sensor devices 22 and 24 is so configured that a mechanical stress on an associated p-doped piezo 34a through which a current j is passed causes a change in a voltage U oriented perpendicularly to current j. Preferably, the change in voltage U is measured perpendicularly to current j.

In the case of a longitudinal axis 10 of spring 12 along the 110 crystal direction of the monocrystalline silicon material, it is advantageous to pass current j through p-doped piezos 34a in such a manner that current j is oriented at an angle of 45° to longitudinal axis 10. Current j through p-doped piezos 34a is thus oriented along the 100 crystal direction.

Such an advantageous orientation of current j may be achieved in the case of p-doped piezo 34a of first sensor device 22 by contacting p-doped piezo 34a of first sensor device 22 with a first power supply line 44 and a second power supply line 46 in such a manner that the minimum distance between the two power supply lines 44 and 46 extends along the 100 crystal direction. In addition, second power supply line 46 and a third power supply line 48 may contact p-doped piezo 34a of second sensor device 24 in such a manner that the shortest distance between the two power supply lines 46 and 48 is oriented along the 100 crystal direction. Suitable connection of power supply lines 44 through 48 to a power source ensures a sufficient current j through p-doped piezos 34a of the two sensor devices 22 and 24. For example, power supply lines 44 and 48 may be connected to a positive pole and power supply line 46 may be connected to a negative pole of the power source. For a person skilled in the art, further possible polings of power supply lines 44 through 48 will, however, also be apparent from FIG. 4.

By virtue of the two p-doped piezos 34a of the two sensor devices 22 and 24 being contacted by the common second power supply line 46 it is possible to obtain a comparatively small number of power supply lines 44 through 48 for the power supply of the two p-doped piezos 34a of the two sensor devices 22 and 24. Thus, the spring stiffness of spring 12 with the two p-doped piezos 34a of the two sensor devices 22 and 24 is affected only to a small extent by power supply lines 44 through 48. That is a considerable advantage of the embodiment described herein over the related art in which arrangement of the two p-doped piezos 34a on two springs necessitates a larger number of power supply lines for the power supply of the two p-doped piezos 34a. Monocrystalline silicon has a high mechanical stability, but, being a semiconductor, possesses a relatively high resistance. To minimize that resistance, it is additionally advantageous to route as small as possible a number of power supply lines 44 through 48 via spring 12.

Connected to p-doped piezo 34a of first sensor device 22 are two voltage tapping lines 50 and 52. Preferably, the position of the two voltage tapping lines 50 and 52 is chosen in such a manner that a minimal distance between the two voltage tapping lines 50 and 52 is oriented along the 010 crystal direction of the monocrystalline silicon material. Correspondingly, two voltage tapping lines 54 and 56 are able to contact p-doped piezo 34a of second sensor device 24 in such a manner that a minimal distance between the two voltage tapping lines 54 and 56 also extends along the 010 crystal direction. Voltage tapping lines 50 through 56 provided for tapping voltage U are accordingly formed in such a manner that tapping of voltage U takes place along the 010 crystal direction. That ensures optimal use of the two p-doped piezos 34a of the two sensor devices 22 and 24 to determine mechanical stresses acting on the two p-doped piezos 34a of the two, sensor devices 22 and 24, in other words to establish information regarding the adjustment movements and/or bending movements of the adjustable element and/or of spring 12 by the procedure described hereinafter.

With a V-shaped configuration of first end portion 40, a sufficient mounting surface is ensured for the two p-doped piezos 34a of the two sensor devices 22 and 24 and lines 44 through 56. Since lines 44 through 56 are not routed along spring 12 beyond first end portion 40, they hardly affect the spring stiffness of spring 12.

The two p-doped piezos 34a of the two sensor devices 22 and 24 may be at the same distance from a (virtual) connection surface 26 between spring 12 and holder 16. Similarly, the two p-doped piezos 34a of the two sensor devices 22 and 24 may be at the same distance from a middle point 60 preferably lying on longitudinal axis 10. With such an arrangement of the two p-doped piezos 34a of the two sensor devices 22 and 24, the mechanical stresses exerted on the two p-doped piezos 34 upon bending of spring 12 about the rotation axis oriented non-parallel to longitudinal axis 10, in other words upon adjustment of the adjustable element about the rotation axis, are almost equal. By contrast, torsion of spring 12 about longitudinal axis 10, in other words adjustment of the adjustable element about longitudinal axis 10, in the case of such an arrangement of the two p-doped piezos 34a results in differing mechanical stresses on the two p-doped piezos 34a of the two sensor devices 22 and 24. In both cases, the mechanical stresses include interfering stresses into the 110 crystal direction.

Preferably, in the case of such an arrangement of the two p-doped piezos 34a of the two sensor devices 22 and 24, the evaluation device (not shown) is configured to establish the first information regarding the first adjustment movement and/or bending movement of the adjustable element and/or of spring 12 about longitudinal axis 10 by taking into consideration a difference between the first voltage signal of first sensor device 22, which voltage signal is provided as the first sensor signal, and the second voltage signal of second sensor device 24, which voltage signal is provided as the second sensor signal. In addition, the evaluation device may be configured to establish the second information regarding the second adjustment movement and/or bending movement of the adjustable element and/or of spring 12 about the rotation axis which is non-parallel to longitudinal axis 10 by taking into consideration an average value of the first voltage signal and the second voltage signal. Comparatively little expenditure for establishing reliable first information and reliable second information is ensured in that manner.

In an alternative embodiment, spring 12 may also be constructed in such a manner that longitudinal direction 10 of spring 12 (in the home position) is oriented along the 100 crystal direction of a spring material, preferably silicon. Preferably, in the case of such a construction of spring 12, a respective xducer is used for each of the two sensor devices 22 and 24, which xducer is oriented parallel to the 100 crystal direction, or longitudinal direction 10 of spring 12. If the two sensor devices 22 and 24 have n-doped resistors, those resistors are preferably oriented in the manner illustrated in FIG. 4. If p-doped resistors are used for the two sensor devices 22 and 24, their orientation is advantageously turned through 45°. In all of the embodiments listed herein, the piezo-resistive elements of the two sensor devices 22 and 24 are situated in regions of spring 12 formed along the 100 crystal direction in which a maximum mechanical stress occurs upon bending and/or torsion of spring 12.

Figure 5:
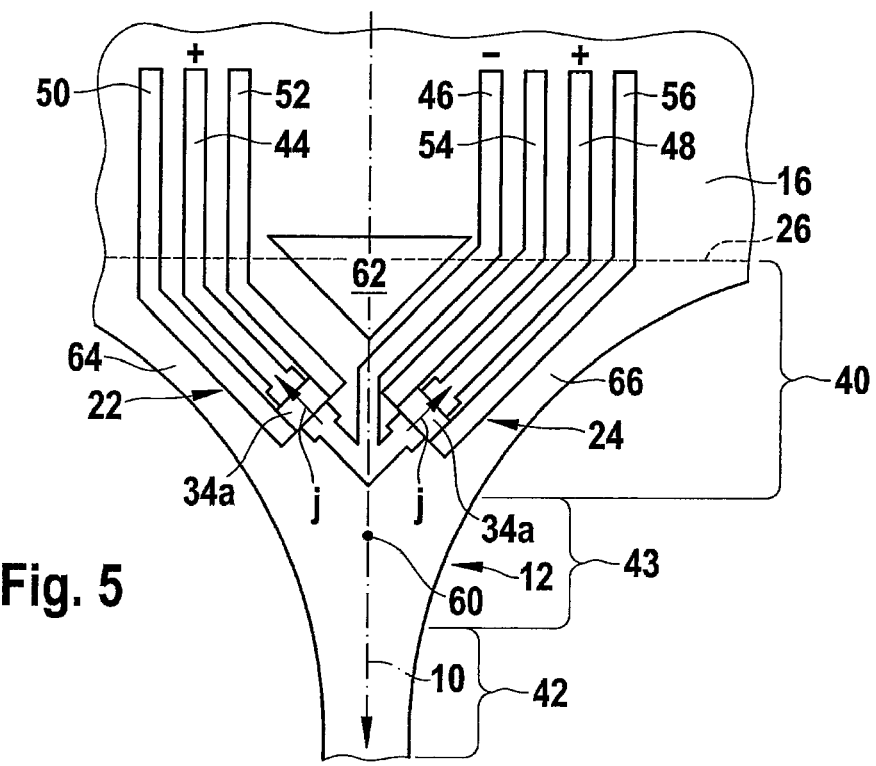
FIG. 5 shows a spring of a fourth embodiment of the micromechanical component.

FIG. 5 shows a spring of a fourth embodiment of the micromechanical component.

In the case of illustrated spring 12, as a supplement to the embodiment of FIG. 4 a continuous opening 62 is formed within first end portion 40, which subdivides first end portion 40 into a first arm 64 and a second arm 66. Preferably, the two arms 64 and 66 form a V-shaped structure.

Preferably, p-doped piezo 34a of first sensor device 22 is situated on or in first arm 64, and p-doped piezo 34a of second sensor device 24 is situated on or in second arm 66. The formation of continuous opening 62 within end portion 40 results in this case in an intensification of the mechanical stresses acting on the two p-doped piezos 34a of the two sensor devices 22 and 24 upon adjustment of the adjustable element about longitudinal axis 10 and/or about the further rotation axis which is non-parallel to longitudinal axis 10. Thus, the two p-doped piezos 34a of the two sensor devices 22 and 24 are specifically situated on spring portions exhibiting comparatively high mechanical stresses upon torsion of spring 12 and/or upon bending of spring 12 about the rotation axis. In that manner, more accurate determination of the first information and the second information is possible.

Figure 6:
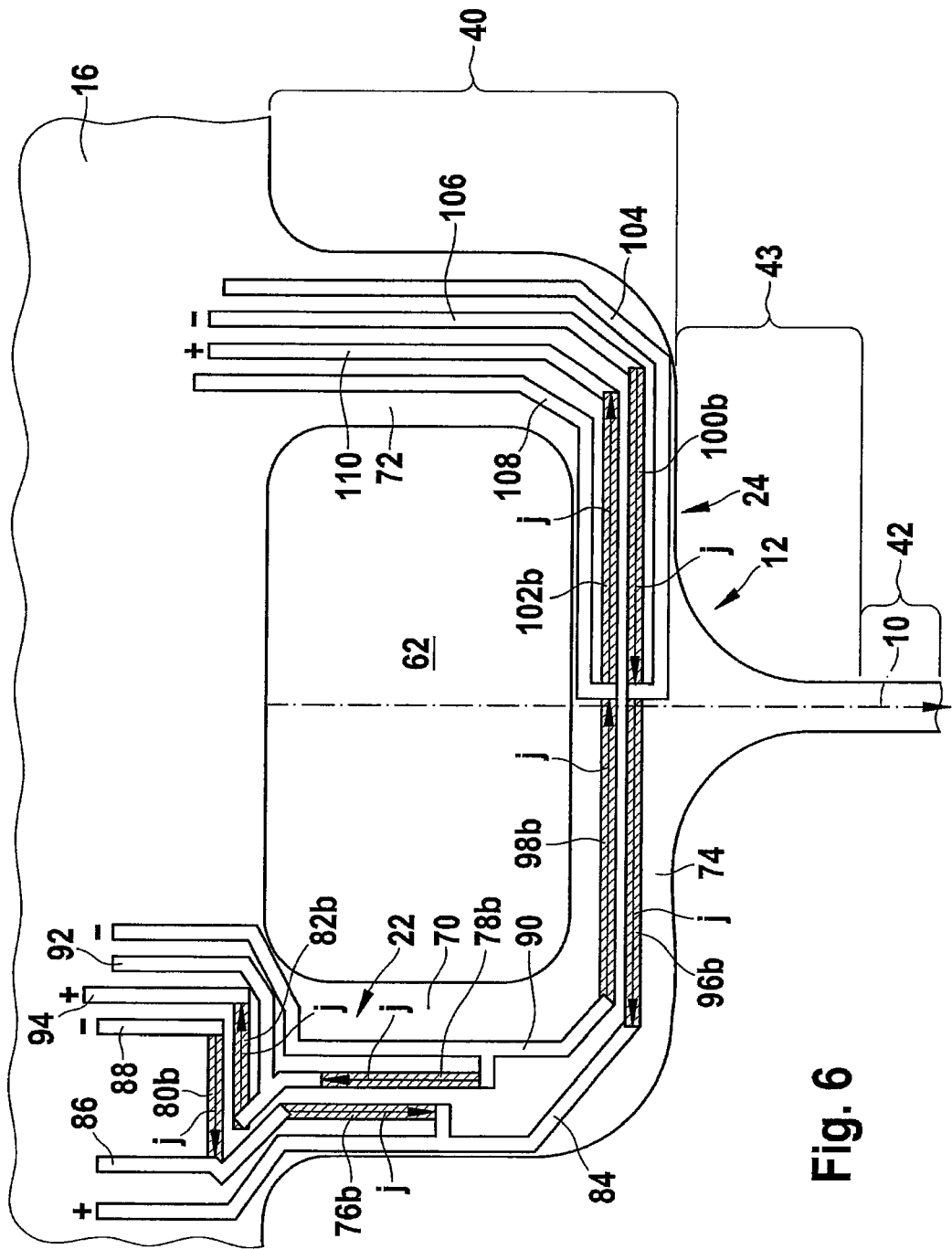
FIG. 6 shows a spring of a fifth embodiment of the micromechanical component.

FIG. 6 shows a spring of a fifth embodiment of the micromechanical component.

Illustrated spring 12 is patterned out of a monocrystalline silicon material in such a manner that longitudinal axis 10 is oriented along the 110 crystal direction of the monocrystalline silicon material. An adjustable element (not shown) is connected via spring 12 to holder 16. Preferably, spring 12 is in one piece with at least one subunit of holder 16 and/or one subunit of the adjustable element.

A first end portion 40 of spring 12, situated adjacent to holder 16, has a widening in relation to a second end portion 42 oriented toward the adjustable element and/or in relation to an intermediate portion 43. In the example illustrated in FIG. 6, second end portion 42 and intermediate portion 43 have an average width of 10 to 20 μm. By contrast, the two outer side faces of first end portion 40 are at a distance of 80 to 150 μm from each other.

In first end portion 40, a (continuous) opening 62 is formed which subdivides first end portion 40 into a first arm 70, a second arm 72 and a connecting web 74. Preferably, connecting web 74 connects first arm 70 to second arm 72 in such a manner that a U-shaped structure is formed. In particular, first arm 70 may be oriented parallel to second arm 72.

In the case of illustrated spring 12, a first sensor device 22 is formed at least partially on first arm 70. First sensor device 22 is a Wheatstone bridge having four p-doped resistors 76b through 82b. A first p-doped resistor 76b and a second p-doped resistor 78b are situated on first arm 70. A third p-doped resistor 80b and a fourth p-doped resistor 82b are preferably so situated on holder 16 that they lie within or close to an anchoring region of first arm 70.

A first power supply line 84 contacts first p-doped resistor 76b of first sensor device 22. In addition, first p-doped resistor 76b is connected via a measuring line 86 to third p-doped resistor 80b of first sensor device 22. Connected to third p-doped resistor 80b of first sensor device 22, there is also a second power supply line 88. First power supply line 84 and second power supply line 88 contact first p-doped resistor 76b and third p-doped resistor 80b of first sensor device 22 in such a manner that a current j flows through first p-doped resistor 76b and third p-doped resistor 80b of first sensor device 22 along the 110 crystal direction, that is, in a direction parallel or perpendicular to longitudinal axis 10 of spring 12.

Second p-doped resistor 78b of first sensor device 22 is connected to a third power supply line 90 and to a second measuring line 92. Second measuring line 92 connects second p-doped resistor 78b to fourth p-doped resistor 82b of first sensor device 22, to which a fourth power supply line 94 is also connected. Third power supply line 90 and fourth power supply line 94 contact second p-doped resistor 78b or fourth p-doped resistor 82b of first sensor device 22 in such a manner that a current j flows through second p-doped resistor 78b and fourth p-doped resistor 82b of first sensor device 22 in a direction parallel or perpendicular to longitudinal axis 10 of spring 12. It is thus ensured that current j is passed along the 110 crystal direction of the monocrystalline silicon material.

For example, first power supply line 84 is connected to a positive pole and second power supply line 88 is connected to a negative pole of a power source. In that case, it is advantageous to connect third power supply line 90 to the negative pole and fourth power supply line 94 to the positive pole of the power source.

First measuring line 86 and second measuring line 92 are configured to tap resistances R, or resistance changes, as a first sensor signal at the four p-doped resistors 76b through 82b of first sensor device 22. Since the mode of operation of a Wheatstone bridge having four p-doped resistors 76b through 82b is known to the person skilled in the art, this is not discussed in detail here.

A second sensor device 24, in the form of a Wheatstone bridge having four p-doped resistors 96b through 102b, is also situated on spring 12. Preferably, the four p-doped resistors 96b through 102b of second sensor device 24 lie at least partially on the connecting web 74. In particular, a first p-doped resistor 96b and a second p-doped resistor 98b may lie on a first side of longitudinal axis 10. In that case, a third p-doped resistor 100b and a fourth p-doped resistor 102b are preferably situated on the second side of longitudinal axis 10.

In the example illustrated, first p-doped resistor 96b of second sensor device 24 is contacted by first power supply line 84 and a third measuring line 104. Third measuring line 104 connects first p-doped resistor 96b to third p-doped resistor 100b of second sensor device 24. A fifth power supply line 106 is connected to third p-doped resistor 100b. Preferably, first power supply line 84 and fifth power supply line 106 contact first p-doped resistor 96b or third p-doped resistor 100b in such a manner that a current j flows through p-doped resistors 96b and 100b of second sensor device 24 in a direction perpendicular to longitudinal axis 10. Current j through p-doped resistors 96b and 100b is in this case oriented along the 110 crystal direction of the monocrystalline silicon material of spring 12. If first power supply line 84 is connected to the positive pole, fifth power supply line 106 is connected to a negative pole of the power source.

In addition, third power supply line 90 contacts second p-doped resistor 98b of second sensor device 24, which second p-doped resistor 98b is additionally connected to a fourth measuring line 108. Fourth measuring line 108 connects second p-doped resistor 98b to fourth p-doped resistor 102b of second sensor device 24. In addition, a sixth power supply line 110 runs to the power source from fourth p-doped resistor 102b of second sensor device 24. If third power supply line 90 contacts the negative pole, sixth power supply line 110 is connected to a positive pole of the power source.

Third power supply line 90 and sixth power supply line 110 may also contact their associated p-doped resistors 98b and 102b of second sensor device 24 in such a manner that current j runs through p-doped resistors 98b and 102b along the 110 crystal direction. In that manner, advantageous and reliable operation of second sensor device 24 in the form of a Wheatstone bridge is ensured. Resistances R/resistance changes may be tapped as the second sensor signal at p-doped resistors 96b through 102b also via third measuring line 104 and fourth measuring line 108.

As the person skilled in the art will appreciate by reference to FIG. 6, the arrangement of the two sensor devices 22 and 24 at least partially on the same spring 12 provides the advantage that a comparatively small number of power supply lines 84, 88, 90, 94, 106 and 110 are necessary for supplying power to p-doped resistors 76b through 82b and 96b through 102b. In that manner it is guaranteed that the flexural rigidity of spring 12 and hence a good adjustability of the adjustable element is hardly affected by power supply lines 84, 88, 90, 94, 106 and 110. It is also ensured that a bending of spring 12, especially of second end portion 42 and/or intermediate portion 43, and/or an adjustment of the adjustable element has hardly any effect or only a slight effect on power supply lines 84, 88, 90, 94, 106 and 110 which may possibly also react in a piezoresistive manner. In addition, the work involved in forming power supply lines 84, 88, 90, 94, 106 and 110 may also be reduced in that manner.

There follows a description of how the information regarding an adjustment movement and/or bending movement of spring 12 and/or of adjustable element may be established reliably and with little effort by taking into consideration the first sensor signal of first sensor device 22 and the second sensor signal of second sensor device 24:

Owing to the continuous opening 62 in first end portion 40, bending of spring 12 results in more intense mechanical stresses at the two arms 70 and 72 and at the connecting web 74. Upon torsion of spring 12 about longitudinal axis 10, comparatively high mechanical stresses occur in connecting web 74, whereas the resulting mechanical stresses in the two arms 70 and 72 remain relatively low. Accordingly, the mechanical stresses that occur upon torsion of spring 12 about longitudinal axis 10 influence primarily the second sensor signal of second sensor device 24. The evaluation device (not shown) of the micromechanical component is therefore advantageously configured to establish first information regarding the first adjustment movement and/or bending movement (torsion) of spring 12 and/or of the adjustable element about longitudinal axis 10 on the basis of the second sensor signal.

Upon adjustment of the adjustable element about the rotation axis which is non-parallel to longitudinal axis 10 and upon the associated bending of spring 12 about the rotation axis, the mechanical stresses in arms 70 and 72 are intensified as compared with the mechanical stresses in connecting web 74. Particularly when the rotation axis is oriented perpendicularly to longitudinal axis 10, bending of spring 12 about the rotation axis causes relatively high mechanical stresses in arms 70 and 72, whereas the mechanical stresses induced in connecting web 74 remain comparatively low.

Whereas, therefore, second sensor device 24 is situated on spring 12 in such a manner that torsion of spring 12 about longitudinal axis 10 may be determined well by way of the second sensor signal, by arranging first sensor device 22 at least partially on or in first arm 70 it is ensured that although torsion of spring 12 about longitudinal axis 10 causes hardly any mechanical stresses on the four p-doped resistors 76b through 82b, bending of spring 12 about the rotation axis results in comparatively high mechanical stresses on the four p-doped resistors 76b through 82b of first sensor device 22. For that reason, the evaluation device is preferably configured to establish the second information regarding the adjustment movement and/or bending movement of spring 12 and/or of the adjustable element about the rotation axis on the basis of the first sensor signal.

In an alternative configuration of spring 12, longitudinal axis 10 may be oriented along the 100 crystal direction. In that case, sensor devices 22 and 24 preferably include n-doped resistors having the disposition and orientation illustrated in FIG. 6. If four p-doped resistors 76b through 82b and 96b through 102b are used for each of sensor devices 22 and 24, respectively, the orientations of p-doped resistors 76b through 82b and 96b through 102b are adapted accordingly.

Figure 7:
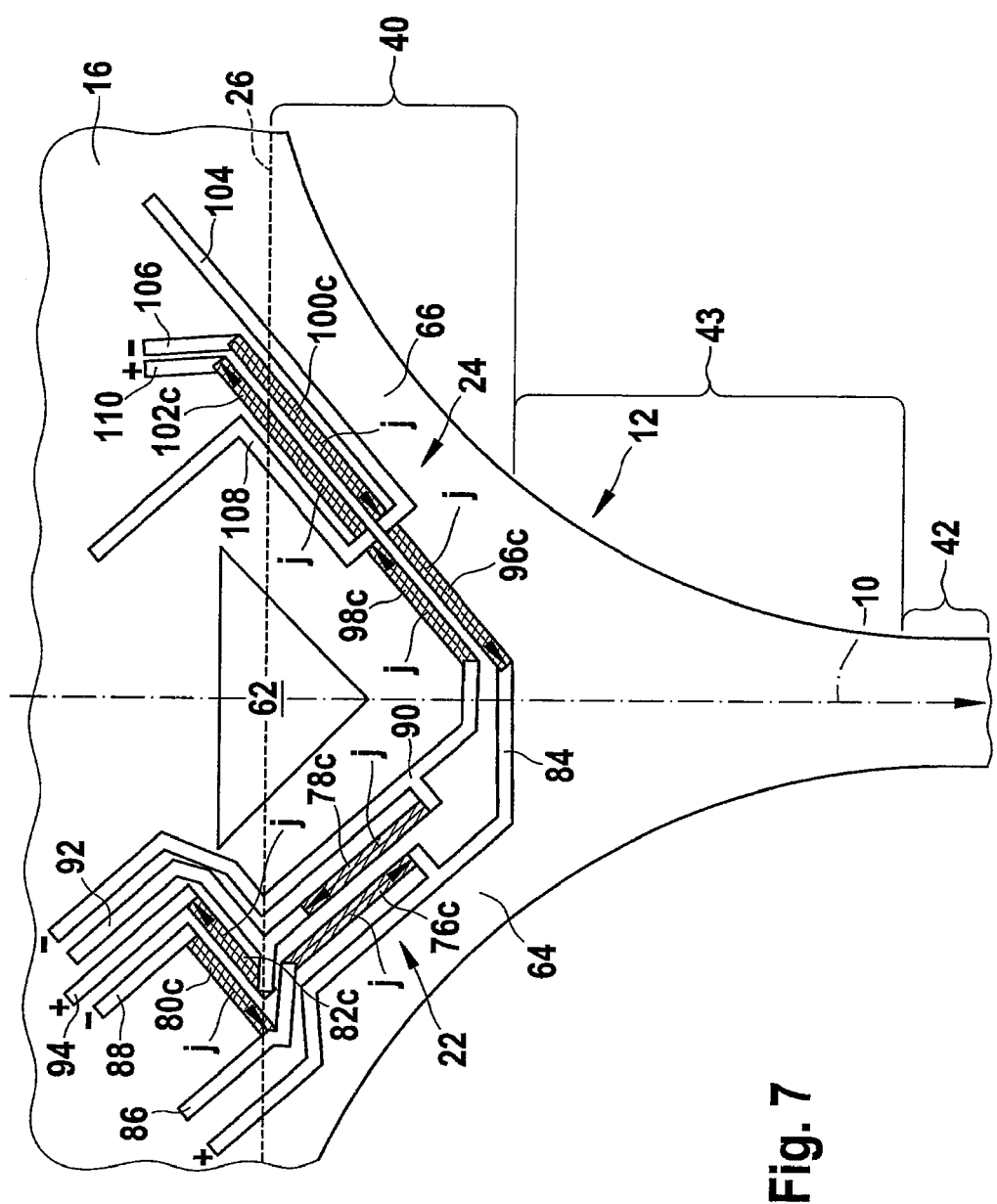
FIG. 7 shows a spring of a sixth embodiment of the micromechanical component.

FIG. 7 shows a spring of a sixth embodiment of the micromechanical component.

Spring 12 illustrated is patterned out of a monocrystalline silicon material in such a manner that longitudinal axis 10 of spring 12 extends along the 110 crystal direction. A first end portion 40 of spring 12, which end portion 40 is formed adjacent to holder 16, has a minimum width that is greater than a minimum width of a second end portion 42 oriented toward the adjustable element and/or of an intermediate portion 43 of spring 12. For example, second end portion 42 and/or intermediate portion 43 have an average width of from 10 to 20 μm. By contrast, the width of first end portion 40 may steadily decrease with increasing distance from holder 16, the width lying, in particular, in a range of from 50 to 150 μm.

In first end portion 40, a continuous opening 62 is formed which subdivides first end portion 40 into a first arm 64 and a second arm 66. Preferably, the two arms 64 and 66 form a V-shaped structure.

Formed at least partially on illustrated spring 12 are a first sensor device 22, a second sensor device 24, power supply lines 84, 88, 90, 94, 106 and 110 and measuring lines 86, 92, 104 and 108. In contrast to the previous embodiment, sensor devices 22 and 24 are, however, each in the form of a Wheatstone bridge having four n-doped resistors 76c through 82c or 96c through 102c, respectively.

Power supply lines 84, 88, 90, 94, 106 and 110 contact their associated resistors 76c through 82c and 96c through 102c in such a manner that a current j runs through each of resistors 76c through 82c and 96c through 102c at an angle of 45° to longitudinal axis 10 of spring 12 oriented along the 110 crystal direction. The orientation of current j through resistors 76c through 82c and 96c through 102c thus corresponds to the advantageous orientation of FIG. 3C. Correspondingly, measuring lines 86, 92, 104 and 108 are also formed in such a manner that measurement of a resistance R/a resistance change takes place at an angle of 45° to longitudinal axis 10, in other words to the 110 crystal direction. Power supply lines 84, 88, 90, 94, 106 and 110 and measuring lines 86, 92, 104 and 108 fulfill the functions already described above. Further description of the functions of power supply lines 84, 88, 90, 94, 106 and 110 and of measuring lines 86, 92, 104 and 108 will therefore be dispensed with here.

The V-shaped structure of first end portion 40 ensures that sufficient mounting area is available for mounting n-doped resistors 76c through 82c on first arm 64 and n-doped resistors 96c through 102c on second arm 66 in accordance with the preferred orientation of n-doped resistors 76c through 82c and 96c through 102c along the 100 crystal direction. Furthermore, a sufficiently large mounting area for forming power supply lines 84, 88, 90, 94, 106 and 110 and measuring lines 86, 92, 104 and 108 is ensured.

Upon torsion of spring 12 about longitudinal axis 10, the mechanical stresses acting on n-doped resistors 76c through 82c differ markedly from the mechanical stresses exerted on n-doped resistors 96c through 102c. For that reason, a difference between the first sensor signal and the second sensor signal is especially suitable for establishing the first information regarding the first adjustment movement and/or bending movement of spring 12 and/or of the adjustable element about longitudinal axis 10. By contrast, the bending of spring 12 about the rotation axis causes almost equal mechanical stresses on n-doped resistors 76c through 82c and 96c through 102c.

Preferably, the evaluation device is therefore configured to establish the first information by taking into consideration a difference between the first sensor signal and the second sensor signal and to determine the second information by taking into consideration an average value of the first sensor signal and the second sensor signal.

In an alternative embodiment, longitudinal axis 10 of spring 12 having subunits 70 through 74 may be oriented along the 100 crystal direction of a silicon material layer out of which spring 12 is patterned. In that case, the p-doped resistors of at least one of sensor devices 22 and 24 are oriented relative to longitudinal axis 10 in accordance with FIG. 7. If at least one of sensor devices 22 and 24 includes n-doped resistors 76c through 82c and 96c through 102c, those resistors are situated in a position turned through 45° relative to the orientation illustrated in FIG. 7. In both cases, sensor devices 22 and 24 may be situated in regions of maximum mechanical stresses.

The information established using one of the above-described embodiments regarding the adjustment movements and/or bending movements of spring 12 and/or of the adjustable element may be used to actuate and/or check a drive of the micromechanical component. Precise detection of the current position of the adjustable element is advantageous for a controlled actuation of the drive of the micromechanical component. As an alternative or in addition, the information established by the evaluation device may also be used to check whether the adjustable element has been reliably brought into a preferred position. By evaluation of the information provided by the evaluation device it is thus possible to achieve improved accuracy in the adjustment of the adjustable element into the preferred position.

In the case of a micromechanical component in the form of a sensor, the information provided by the evaluation device may also be used to ascertain/establish sensor information regarding an external force acting on the adjustable element. The micromechanical component described herein may thus be used both as an actuator and as a sensor.

On the basis of the two preceding embodiments, constructions of sensor devices 22 and/or 24 in which individual resistors and/or half bridges are used in place of Wheatstone bridges will also be apparent to the person skilled in the art. Similarly, embodiments having at least one piezo-resistive sensor element situated on or in an anchoring region of the spring will also be apparent to the person skilled in the art by reference to the Figures. Such constructions and arrangement possibilities of sensor devices 22 and/or 24 will not, therefore, be discussed further here.

As the person skilled in the art will also appreciate, sensor devices 22 and/or 24 may also include different piezo-resistive sensor elements. Such combinations of the preceding embodiments are not, therefore, described here.

What is claimed is:

1. A micromechanical component, comprising:
a holder;
an adjustable element connected to the holder via at least a spring;
a first sensor device having at least one first piezo-resistive sensor element, the first sensor device being configured to provide a first sensor signal relating to a first mechanical stress acting on the at least one first piezo-resistive sensor element, and the first piezo-resistive sensor element being disposed at least one of (i) on or in a first anchoring region of the spring, which first anchoring region is adjacent to the holder, and (ii) on or in a second anchoring region of the spring, which second anchoring region is adjacent to the adjustable element; and
a second sensor device having at least one second piezo-resistive sensor element, the second sensor device being configured to provide a second sensor signal relating to a second mechanical stress acting on the at least one second piezo-resistive sensor element, and the second piezo-resistive sensor element being disposed at least one of (i) on or in the first anchoring region of the spring, and (ii) on or in the second anchoring region of the spring;
wherein the spring is patterned out of a monocrystalline silicon material, and wherein the longitudinal direction of the spring is one of oriented along the 110 crystal direction or oriented along the 100 crystal direction of the monocrystalline silicon material.

2. The micromechanical component as recited in claim 1, wherein at least one of the first piezo-resistive sensor element and the second piezo-resistive sensor element is situated on or in the spring.

3. The micromechanical component as recited in claim 1, further comprising:
an evaluation device configured to establish, taking into consideration the first and second sensor signals, the following: (i) first information regarding at least one of a first adjustment movement of the adjustable element, a first bending movement of the adjustable element, and a first bending movement of the spring about a first rotation axis which is oriented along a longitudinal axis of the spring; and (ii) second information regarding at least one of a second adjustment movement of the adjustable element, a second bending movement of the adjustable element, and a second bending movement of the spring about a second rotation axis which is non-parallel to the first rotation axis.

4. The micromechanical component as recited in claim 3, wherein the evaluation device is additionally configured to establish (i) the first information taking into consideration a difference between the first sensor signal and the second sensor signal, and (ii) the second information taking into consideration an average value of the first sensor signal and the second sensor signal.

5. The micromechanical component as recited in claim 1, wherein at least one of the first sensor device and the second sensor device is one of: (i) a Wheatstone bridge having a p-doped resistor as the associated piezo-resistive sensor element; (ii) a Wheatstone bridge having an n-doped resistor as the associated piezo-resistive sensor element; (iii) an xducer having a p-doped piezo as the associated piezo-resistive sensor element; or (iv) an xducer having an n-doped piezo as the associated piezo-resistive sensor element.

6. The micromechanical component as recited in claim 1, wherein a first end portion of the spring is connected to the holder and has a continuous opening which subdivides the first end portion at least into a first arm and a second arm, and wherein the first piezo-resistive sensor element and the second piezo-resistive sensor element are situated on or in the first end portion.

7. A micromechanical component, comprising:
a holder;
an adjustable element connected to the holder via at least a spring;
a first sensor device having at least one first piezo-resistive sensor element, the first sensor device being configured to provide a first sensor signal relating to a first mechanical stress acting on the at least one first piezo-resistive sensor element, and the first piezo-resistive sensor element being disposed at least one of (i) on or in a first anchoring region of the spring, which first anchoring region is adjacent to the holder, and (ii) on or in a second anchoring region of the spring, which second anchoring region is adjacent to the adjustable element; and
a second sensor device having at least one second piezo-resistive sensor element, the second sensor device being configured to provide a second sensor signal relating to a second mechanical stress acting on the at least one second piezo-resistive sensor element, and the second piezo-resistive sensor element being disposed at least one of (i) on or in the first anchoring region of the spring, and (ii) on or in the second anchoring region of the spring;
wherein a first end portion of the spring is connected to the holder and has a continuous opening which subdivides the first end portion at least into a first arm and a second arm, and wherein the first piezo-resistive sensor element and the second piezo-resistive sensor element are situated on or in the first end portion; and
wherein the first arm and the second arm form a V-shaped structure, and wherein the first piezo-resistive sensor element is situated at least partially on or in the first arm and the second piezo-resistive sensor element is situated at least partially on or in the second arm.

8. A micromechanical component, comprising:
a holder;
an adjustable element connected to the holder via at least a spring;
a first sensor device having at least one first piezo-resistive sensor element, the first sensor device being configured to provide a first sensor signal relating to a first mechanical stress acting on the at least one first piezo-resistive sensor element, and the first piezo-resistive sensor element being disposed at least one of (i) on or in a first anchoring region of the spring, which first anchoring region is adjacent to the holder, and (ii) on or in a second anchoring region of the spring, which second anchoring region is adjacent to the adjustable element; and
a second sensor device having at least one second piezo-resistive sensor element, the second sensor device being configured to provide a second sensor signal relating to a second mechanical stress acting on the at least one second piezo-resistive sensor element, and the second piezo-resistive sensor element being disposed at least one of (i) on or in the first anchoring region of the spring, and (ii) on or in the second anchoring region of the spring;
wherein a first end portion of the spring is connected to the holder and has a continuous opening which subdivides the first end portion at least into a first arm and a second arm, and wherein the first piezo-resistive sensor element and the second piezo-resistive sensor element are situated on or in the first end portion; and
wherein the continuous opening subdivides the first end portion into the first arm, the second arm and a connecting web connecting the first arm with the second arm, wherein the first arm, the second arm and the connecting web form a U-shaped structure, and wherein the first piezo-resistive sensor element is situated at least partially on or in the first arm and the second piezo-resistive sensor element is situated at least partially on or in the connecting web.

9. The micromechanical component as recited in claim 8, wherein the evaluation device is additionally configured to (i) establish the first information taking into consideration the second sensor signal, and (ii) establish the second information taking into consideration the first sensor signal.

10. A method of producing a micromechanical component, comprising:
connecting an adjustable element to a holder via at least a spring;
forming a first sensor device having at least one first piezo-resistive sensor element, the first sensor device being configured to provide a first sensor signal relating to a first mechanical stress acting on the at least one first piezo-resistive sensor element, and the first piezo-resistive sensor element being disposed at least one of (i) on or in a first anchoring region of the spring, which first anchoring region is adjacent to the holder, and (ii) on or in a second anchoring region of the spring, which second anchoring region is adjacent to the adjustable element; and
forming a second sensor device having at least one second piezo-resistive sensor element, the second sensor device being configured to provide a second sensor signal relating to a second mechanical stress acting on the at least one second piezo-resistive sensor element, and the second piezo-resistive sensor element being disposed at least one of (i) on or in the first anchoring region of the spring, and (ii) on or in the second anchoring region of the spring;
wherein the spring is patterned out of a monocrystalline silicon material, and wherein the longitudinal direction of the spring is one of oriented along the 110 crystal direction or oriented along the 100 crystal direction of the monocrystalline silicon material.

* * * * *